March 17, 1959     C. F. JOHNSON     2,877,818
ANCHOR BOLT WITH SPRING BIASED REAMING PLATES
Filed Nov. 7, 1956
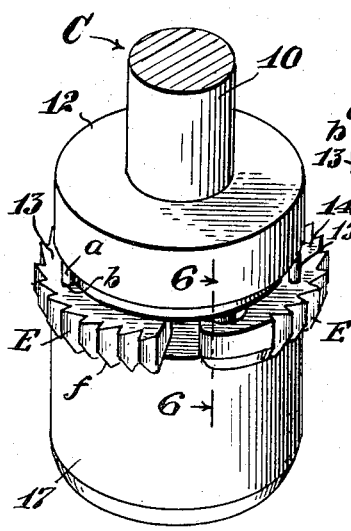
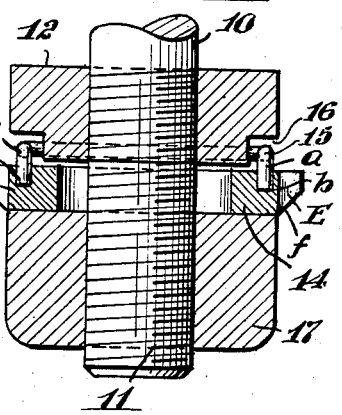
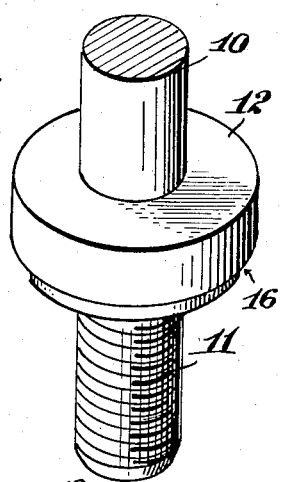
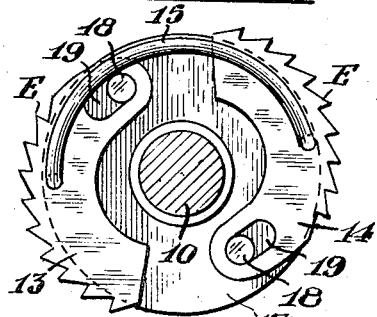
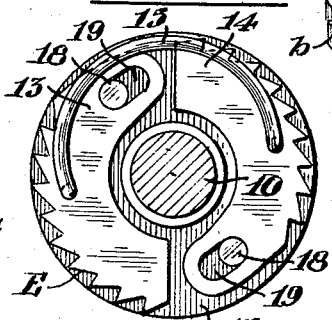
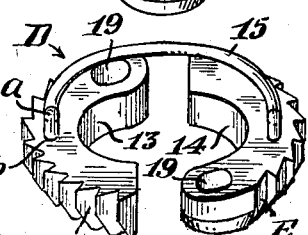
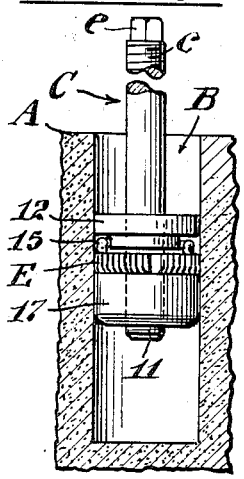
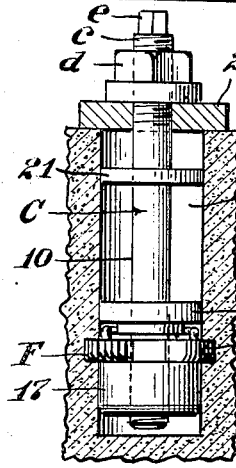
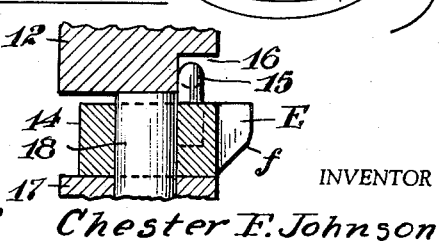
INVENTOR
Chester F. Johnson
BY R. S. Berry
ATTORNEY

2,877,818
ANCHOR BOLT WITH SPRING BIASED REAMING PLATES

Chester F. Johnson, Los Angeles, Calif.

Application November 7, 1956, Serial No. 620,938

2 Claims. (Cl. 151—41.73)

This invention relates to an anchor bolt and particularly pertains to improvements in the type of anchor bolt set forth in Letters Patent No. 2,643,573 issued to me June 30, 1953, which type of anchor bolt is characterized by the embodiment of a contractable and expansible element engageable with a counter-bore in the wall of an opening in which the bolt is inserted, this application being a continuation-in-part of the applicaton Serial Number 540,193 filed by me October 13, 1955 and now abandoned.

Anchor bolts of the above type are generally applicable for use in attaching various objects to bodies such as walls, floors, ceilings and the like where it is inexpedient to provide the body with bolt receiving apertures extending therethrough, and where it is necessary to effect anchorage for a bolt within a preformed socket.

The anchor bolt of the present invention is subject to general usage where the bolt receiving socket is to be formed with a counter-bore, but is particularly applicable to the fastening of structures to bodies formed of masonry, concrete and similar materials especially where positive engagement with the body is essential.

The invention contemplates equipping an anchor bolt with a counter-bore forming and engaging element comprising a divided under-reamer which is subject to being contracted when inserted in a socket and then be expanded and rotated to form a counter-bore in the socket so as to underlie and abut a shoulder constituting a wall of the counter-bore.

The primary object of the invention is to provide an anchor bolt of the above recited type in which the counter-bore forming and engaging under-reamer is easily contractable whereby its insertion in a cavity is facilitated, and wherein such reamer is so formed that it may be readily and economically manufactured.

Another object is to provide a mounting for the counter-bore forming and engaging reamer on the shank of the anchor bolt, such that free contractive and expansive movement of the reamer will be insured and binding of the reamer accordingly prevented, and whereby ease of application of the anchor bolt is attained.

Another object is to provide a construction whereby the counter-bore forming and engaging reamer may be readily assembled on the bolt.

A further object is to provide an anchor bolt of the above character which is capable of being dismantled and removed from a socket without damaging the latter.

With the foregoing objects in view together with such other objects and advatages as may subsequently appear, the invention resides in the parts and in the combination, construction and arrangement of parts hereinafter described and claimed, and as illustrated by way of example in the accompanying drawing in which:

Fig. 1 is an isometric view of the counter-bore forming and engaging reamer of the anchor bolt with the parts shown in their normal position:

Fig. 2 is a view in vertical section partly in elevation of the structure shown in Fig. 1:

Fig. 3 is an isometric view of the disassembled parts of the structure shown in Figs. 1 and 2:

Fig. 4 is a horizontal section and plan view taken substantially on the line 4—4 of Fig. 2; showing the divided under-reamer in its normal expanded position:

Fig. 5 is a view similar to Fig. 4 showing the under-reamer in its contracted position:

Fig. 6 is a detail in section taken on the line 6—6 of Fig. 1:

Fig. 7 is a section through a portion of a concrete body illustrating the manner of applying the anchor bolt to an opening in the concrete and showing the bolt partly inserted in the opening and:

Fig. 8 is a view similar to Fig. 7 showing the bolt in its anchored position in the openng.

Referring to the drawings more specifically A indicates a body formed with a cylindrical bolt-receiving dead-ended bore B and C indicates generally an anchor bolt adapted to be positioned in the bore B and engaged in a counter-bore therein. The body A is here shown as formed of concrete, but manifestly may comprise any solid material to which a structure may be attached by anchor bolts.

The bolt C embodies a cylindrical shank 10 formed with threads 11 on its inner end portion on which is screwed a circular abutment collar 12 which is positioned in spaced relation to the inner end of the shank and is fixed in place on the latter by jambing the collar against the unthreaded portion of the shank 10 at the inner end of the threads 11.

Encompassing the shank 10 immediately below and in slidable relation to the under-side of the collar 12 is a contractable and expansible element D, which element constitutes a divided reamer composed of separate complementary flat arcuate plate sections 13—14 diametrically opposed in coplanar relation and normally spaced apart and spaced from the shank 10. The plate sections 13—14 are formed on their outer margins with cutting teeth E adapted to effect a reaming action on the wall of the bore B to form a counter-bore F therein.

A bowed wire spring 15 of general U-shaped form is attached at its ends to the outer marginal portions of the upper faces of the plate sections 13—14 as by engaging the ends a—a thereof in sockets b—b in the plate sections, the spring overlying the top faces of the sections within the boundaries thereof and being tensioned to normally hold the sections in their expanded or relatively spaced apart position. When thus disposed the outer arcuate toothed margins of the sections 13—14 normally protrude substantially throughout their length beyond the adjacent margin of the collar 12 and have a span exceeding the diameter of the bore B. The inner margins of the sections 13—14 are spaced from the shank 10 and the outer arcuate toothed margins thereof are substantially concentric with the margin of the collar 12 and substantially register with such margin when in their contracted position.

In order to accommodate the spring 15 the margin of the collar 12 is formed with a peripherial channel 16 which opens to the underside of the collar and overlies the spring.

As a means for holding the element D in slidable abutting relation to the collar 12 a nut 17 is screwed on the threads 11 which nut is fitted with a pair of studs 18—18 on its inner end arranged to abut the collar 12 to form a space between the nut 17 and collar 12 in which the sections 13—14 may freely move. As here shown the studs 18—18 extend through slots 19—19 formed in the sections 13—14 adjacent inner ends thereof so as to afford pivotal connection between the sections 13—14 and the nut 17 and also limit longitudinal movement of the sections around the shank.

The outer end portion of the shank 10 is formed with threads c for the reception of a nut d whereby an object 20 through which the outer end portion of the bolt projects may be clamped against the body A. The bolt terminates at its outer end in a wrench-hold e.

The collar 12 and nut 17 are formed to have perimeters slidably conformable to the wall of the bore B as are the toothed arcuate outer margins of the element D when contracted.

As a means for facilitating initial entry of the element D into the bore B the outer marginal portions of the sections 13—14, including the teeth E on the sides of the sections thereof opposite the spring 15 are beveled or rounded as indicated at f in Fig. 6.

A feature of the invention resides in forming the teeth E with their cutting edges at least substantially paralleling the axis of the shank 10 and presented in the direction of the lead of the threads 11 which is preferably right handed so that on tightening the nut on the shank until the studs 18—18 abut the collar 12 rotation of the bolt clockwise will carry the bolt therewith so that the studs 18—18 will advance the sections 13—14 with the cutting edges of the teeth E presented in the direction of turning movement of the bolt.

Mounted on the shank 10 at a suitable point intermediate its ends in spaced relation to the collar 12 is a circular washer 21 having a diameter corresponding to the diameter of the collar, which washer co-acts with the collar in positioning the bolt in axial alignment with the bore B.

In the operation of the invention, in applying the bolt, the sections 13—14 of the element D which are normally expanded relative to each other as shown in Fig. 4, are initially retracted toward each other in opposition to the spring 15 as by laterally pressing them intermediate their ends between the thumb and fingers and their rounded or beveled inner margins f are seated on the margin of the bore B with the inner end of the bolt together with the nut 17 positioned within the bore. On inward pressure being imposed on the bolt the sections 13—14 will be forced toward each other as the margins thereof ride over the margin of the bore. The element D is thus contracted so that its margins will ride on the wall of the bore B, as the bolt is advanced in the latter.

On the bolt being moved to bring the element D to the desired position for forming the counter-bore C, the spring 15 then being under tension will act to force the sections 13—14 diametrically outward so that on rotating the bolt clockwise the teeth E will cut into the surface of the bore B and form the counterbore F. The projecting upper faces of the toothed marginal portions of the sections 13—14 will then extend substantially throughout their length in overlying relation to the shoulder constituting the upper wall of the counter-bore. Positive engagement of the bolt with the body A will thus be effected. The object 20 to be fastened in place is then applied to the outer end of the bolt and secured by the nut d.

In event it be desired to remove the bolt from the bore B it is turned counter-clockwise as by means of a wrench engaged with the wrench-hold e so as to unscrew the threads 11 from the nut 17 thereby releasing the shank 10 and permitting its withdrawal from the bore B, the nut 17 then being held against rotation by gripping action of the toothed sections 13—14 on the walls of the counter-bore F.

The nut 17 and element D will then remain in the bore but may be fished out if need be, the element D by reason of being in two pieces connected by the wire 15 being subject to being ruptured or collapsed by a fishing tool to permit removal thereof.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. An anchor bolt comprising a shank having a threaded inner end portion, a circular collar encircling said shank and fixed thereon in spaced relation to the inner end thereof, a pair of opposed flat coplanar arcuate plate sections supported astride said shank in spaced relation thereto and in slidable relation to said collar for free movement toward and away from each other transversely of said collar, said arcuate sections having outer margins concentric with said collar and substantially conforming to the periphery of said collar when said sections are in their retracted positions, a U-shaped bow spring having its ends affixed to said sections substantially midway of the ends thereof normally thrusting said sections apart laterally thereof diametrically of said shank and being yieldable to permit advance of said sections toward each other; said spring being arranged on the faces of said sections presented to said collar, said collar being formed with a continuous channel on the margin of the side thereof presented to said section to freely accommodate said spring, a nut on the threaded end of said shank slidably abutting said sections, studs on said nut pivotally engaging said sections and limiting longitudinal movement thereof, said studs abutting said collar, and reaming teeth on the outer margins of said sections.

2. In an under reaming anchor bolt, a threaded shank, a collar on said shank, a nut screwed on said shank having an inner end, a pair of diametrically opposed studs on the inner end of said nut having outer ends presented toward said collar for abutting relation therewith, a pair of arcuate plates interposed between said nut and collar and extending on opposite sides of said shank in spaced relation thereto, said plates having elongated longitudinally extending slots through which said studs extend whereby said plates are pivoted on said studs to swing toward and away from each other diametrically of said shank and are also movable longitudinally relative to each other, a series of reaming teeth on the outer margins of said plates extending along the major portion of the lengths thereof, and a U-shaped wire spring arranged between said collar and nut and lying within the boundary of said collar having its ends engaged with said plates intermediate the ends thereof, said plates being movable inwardly on said studs in opposition to said spring to a position within the boundary of said collar and being movable to an outwardly extended position under the urge of said spring with the teeth thereof projecting beyond the margin of said collar.

References Cited in the file of this patent

UNITED STATES PATENTS

| | | |
|---|---|---|
| 1,794,899 | Hufferd | Mar. 3, 1931 |
| 2,209,495 | Scholfield | July 30, 1940 |
| 2,643,573 | Johnson | June 30, 1953 |
| 2,698,552 | Smith | Jan. 4, 1955 |
| 2,707,897 | Beeson | May 10, 1955 |
| 2,729,038 | Hutchins | Jan. 3, 1956 |